United States Patent [19]
Cousin

[11] 3,769,735
[45] Nov. 6, 1973

[54] LINE GUIDE ATTACHMENT FOR FISHING RODS

[75] Inventor: Barry D. Cousin, Walkerton, Ind.

[73] Assignee: Plas/Steel Products, Inc., Walkerton, Ind.

[22] Filed: Aug. 2, 1971

[21] Appl. No.: 168,334

Related U.S. Application Data

[62] Division of Ser. No. 30,133, April 20, 1970.

[52] U.S. Cl. .................................................. 43/24
[51] Int. Cl. .......................................... A01k 87/04
[58] Field of Search .......................................... 43/24

[56] References Cited
UNITED STATES PATENTS

| | | | |
|---|---|---|---|
| 2,619,714 | 12/1952 | Dornaus | 43/24 X |
| 2,740,221 | 4/1956 | Kono | 43/24 |
| 754,094 | 3/1904 | Roth | 43/24 |
| 911,119 | 2/1909 | Farr | 43/24 X |
| 2,721,412 | 10/1955 | Smiley | 43/24 |
| 3,403,468 | 10/1968 | Bartoletti | 43/24 |

FOREIGN PATENTS OR APPLICATIONS

| | | | |
|---|---|---|---|
| 278,884 | 1/1965 | Australia | 43/24 |
| 1,088,082 | 9/1954 | France | 43/24 |

Primary Examiner—Russell R. Kinsey
Assistant Examiner—Daniel J. Leach
Attorney—Hood, Gust, Irish, Lundy & Coffey

[57] ABSTRACT

A line guide having two collinearly extending legs flush with the surface of a fishing rod securely affixed thereto by means of preformed helical wire coils surrounding both the legs and the rod. The method and apparatus for attaching the line guide to the rod includes a pair of relatively movable fixtures having die cavities adapted to receive an assembly of helical wire coils and a line guide in such position that the legs of the line guide are fitted into the coils. The fixtures are provided with collinear die bores through which may be inserted in succession a tapered rod, the die bores being in registry with the wire coils such that the rod can pass therethrough. The rod is forced into tight engagement with the coils relative movement between the fixtures facilitating engagement first with the coils in the recess of one fixture and secondly with the coils in the recess of the other fixture.

5 Claims, 7 Drawing Figures

PATENTED NOV 6 1973 3,769,735
SHEET 1 OF 2
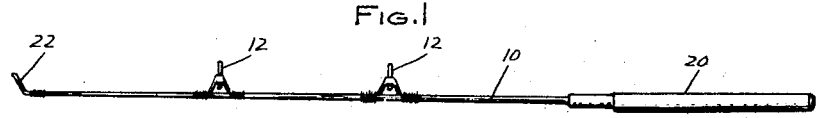
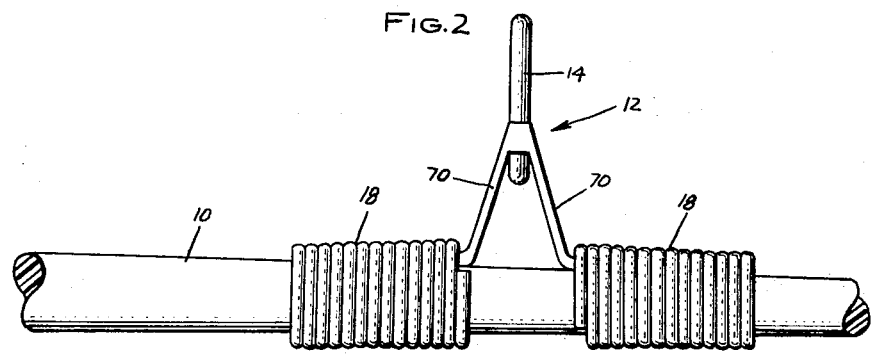
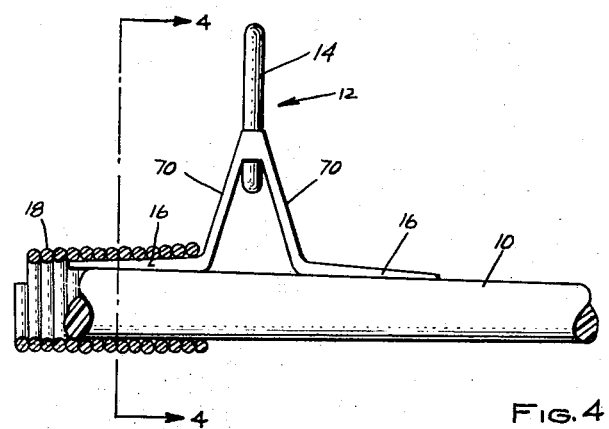
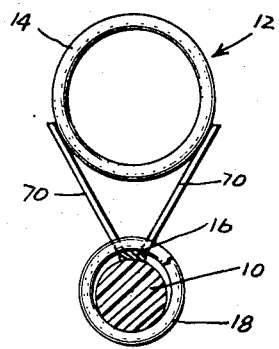
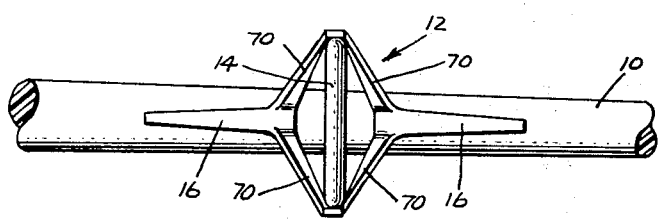

LINE GUIDE ATTACHMENT FOR FISHING RODS

This is a divisional application of application, Ser. No. 30,133, filed Apr. 20, 1970.

THE INVENTION

This invention relates to a line guide attachment for fishing rods.

Fishing rods conventionally include a plurality of line guides secured to the rod at spaced intervals for guiding the fishing line from the reel to the top of the rod. Line guides conventionally comprise a ring through which the line passes and a pair of oppositely extending legs or tangs. In conventional fishing rods, the legs of the line guides are secured to the rod by wrapping with thread which is thereafter coated with a suitable resin. There is a tendency, however, for such wrapping to unravel after the rod has been used for a time and exposed to moisture. Other methods of attaching line guides to fishing rods have been proposed, but these have not become popular, for various reasons including expense, weakening of the rod at points of attachment, alteration of the flexural characteristics of the rod and the like.

It is desirable to provide an improved attachment for line guides which will hold the line guide securely in place, affect the flexural characteristics of the rod no more than minimally, is resistant to weather and scuffing, is the ultimate in simplicity and is of relatively low cost.

It is, therefore, an object of this invention to provide an improved attachment for line guides on fishing rods.

Another object of this invention is to provide an improved attachment characterized by its simplicity, durability, low cost, and resistance to weather and moisture.

In its broader aspects, this invention includes a line guide fastened to a rod by means of preformed helical wire coils.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side view of a typical casting rod utilizing the present invention;

FIG. 2 is a side view of a part of the rod of FIG. 1 showing the line guide and the attachment in enlarged form;

FIG. 3 is a view similar to FIG. 2 but with one wire coil removed and the other shown in longitudinal section;

FIG. 4 is a cross-section taken substantially along the line 4—4 of FIG. 3;

FIG. 5 is a top view of the arrangement of the preceding figures showing the position of the line guide on the rod but with the attaching coils being absent therefrom;

THE DESCRIPTION

Figure 6:
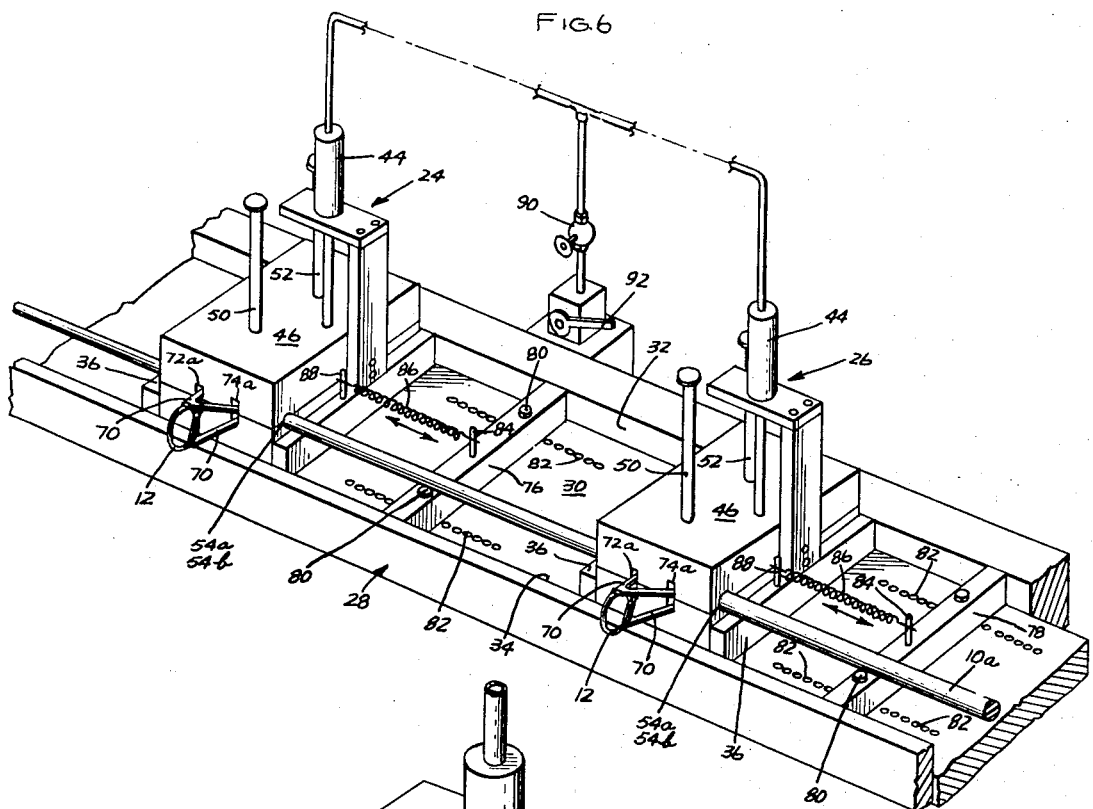
FIG. 6 is a perspective illustration of one embodiment of the apparatus of this invention.

Referring to the drawings, and more particularly to FIGS. 1 through 5, the rod 10 is conventionally tapered and of cylindrical cross-section. Preferably it is formed of cured thermosetting resin, such as epoxy or polyester, reinforced with glass fiber which is now conventional. The rod of FIG. 1 is a conventional casting rod having two line guides 12 attached thereto. The line guide as shown more clearly in FIGS. 2 through 5 includes a ring element 14 supported by a pair of elongated oppositely extending collinear legs 16. These legs 16 are secured to the rod in the position shown by means of two close-wound helical wire coils 18 which surround snugly both the rod 10 and the respective legs 16. The rod includes the usual handle 20 and an eyelet 22 on the tip.

The construction of the eyelet is conventional. The two legs 16 are tapered as shown, and the coils 18, preferably have lengths longer than the respective legs 16 as shown more clearly in FIG. 3.

The diameter of each coil 18 prior to assembly of the rod is preformed to be slightly larger than the rod in the region where the line guide 12 is to be attached. Stated further, when the coil 18 is properly assembled to secure the leg 16 to the rod 10, it is stressed to be slightly deformed such that it exerts a resilient clamping force that produces intimate engagement of the respective leg 16 with the surface of the rod 10. The size of the wire, which may be steel or some other suitable metal, is such that the cumulative force exerted by all of the various coils that engage the leg 16 is sufficient for the leg 16 to be securely frictionally attached to the rod 10.

Each coil 18 is further of a diameter that it will firmly clamp the respective leg 16 along the entire length thereof to the rod 10 even though the leg 16 is tapered as shown.

Generally speaking, each line guide assembly (this assembly including the coils 18) is assembled to the rod 10 by sliding or telescoping two of the coils 18 onto the rod, with the tip eyelet 22 removed, to the approximate location on the length of the rod where the taper begins to snug into the coils which is where the line guide is to be secured. The legs 16 are inserted into the coils in engagement with the surface of the rod 10, following which the rod is forced more deeply into the coils until they tightly engage the larger diameter portion thereof. The coils 18 are slightly distended or otherwise deformed by the force of this telescoping action such that the coils tend to restore themselves to normal shape thereby to exert the clamping force previously described.

Figure 7:
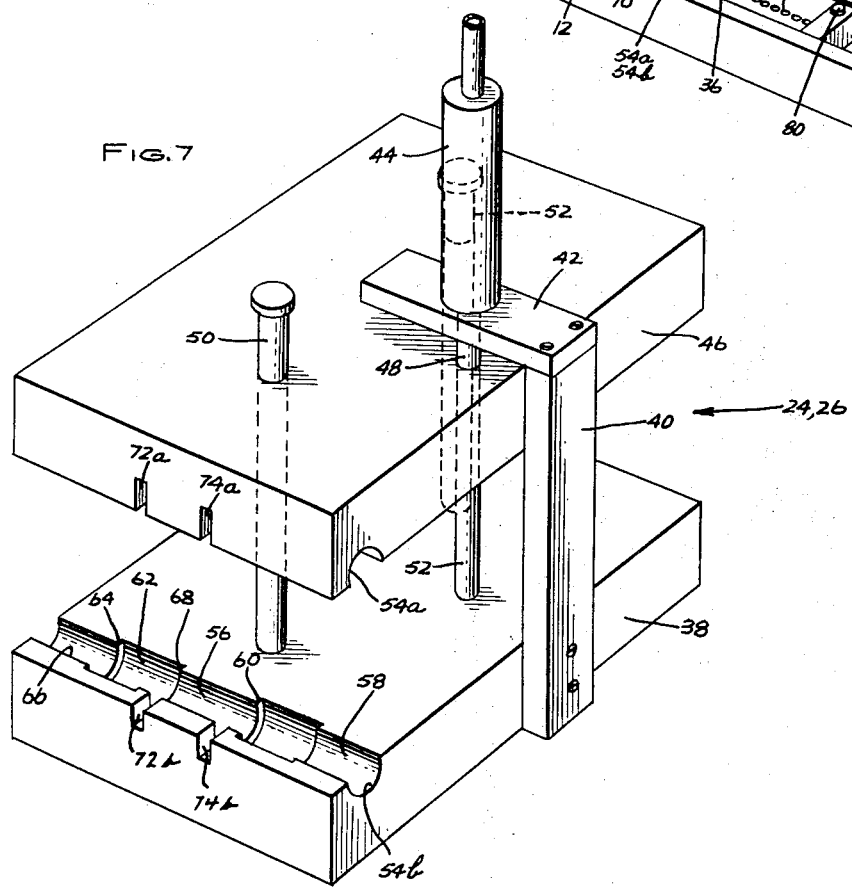
FIG. 7 is an enlarged perspective view of one of the fixtures of FIG. 6 opened to a position to receive an assembly of a line guide and two attaching coils.

The apparatus and method preferred for assembling the line guides 12 to the rod will now be described. Referring to FIGS. 6 and 7, the apparatus there shown is adapted to attach two line guide assemblies 12 to the rod in the relative positions shown in FIG. 1. The apparatus includes two substantially identical fixtures 24 and 26 which differ in only one minor respect as will be explained later. Therefore, a description of one will suffice for both. The fixtures 24 and 26 are mounted for relative rectilinear motion on a stationary slide or carrier 28 having a flat, horizontal bottom and two upstanding, parallel sides 32. Each fixture includes a sliding block 36 of rectangular shape which just fits between the two upright surfaces 32 and 34 for guided sliding movement on the bottom 30.

Referring to FIG. 7, each fixture 24, 26 includes a base block 38 of steel which is secured to the respective sliding block 36. An upright supporting post 40 is secured to the base block 38 and to an elevated horizontal arm 42. Secured to the outer end of the arm 42 is an air cylinder 44 having a piston (not shown) secured to a relatively flat block 46 of steel by means of a suitable piston rod 48. The block 46 is disposed beneath the supporting arm 44 such that it can be moved vertically relative to the base block 38. Also, the block 46 in size and shape is substantially identical to the block 38 and is movable downwardly from the position shown in FIG. 7 to engage its flat surface with the upper flat surface of the block 38 as shown more clearly in FIG. 6.

Guiding the block 46 for precise vertical movement relative to the block 38 are two vertical guide pins 50 and 52 secured at the lower ends to the base block 38 and slidably received in close-fitting bores in the upper block 46. Thus, operation of the air cylinder 44 can serve to move the upper block 46 vertically in precise registry with the lower block 38.

The two blocks 38 and 46 together have a die bore 54a, 54b formed in the facing surfaces thereof, one part-cylindrical portion 54a being in the movable block 46 and the other part-cylindrical portion 54b being in the base block 38. When the block 46 is lowered into engagement with the block 38, the two bore parts 54a and 54b together form a single cylindrical bore of the shape shown in FIG. 7. Since these two bores 54a and 54b are identical counterparts, a description of the bore part 54b will suffice for both. The bore 54a, 54b is of reduced diameter in the midportion, indicated by the numeral 56, this diameter being slightly larger than that of the rod 10 which is to be inserted thereinto. Immediately to the right of the bore portion 56 as shown in FIG. 7, the bore portion 54a, 54b is enlarged to a diameter coincident with a coil 18, this enlarged bore portion being indicated by the numeral 58. A flat, radial shoulder 60 separates the two bore portions 56 and 58 and provides an abutment against which the coil 18 may engage.

On the left end, the bore portion 56 is joined by another larger diameter portion 62, this diameter coinciding with the outside diameter of the coil 18 which is inserted thereinto. Radial shoulders 64 and 68 are provided at the opposite ends of the portion 62. The left-hand end 66 of the bore portion 54a, 54b is of a diameter slightly larger than the portion of the rod 10 which is to be inserted thereinto.

The engaged surfaces of the two blocks 46 and 38 are further provided with slots 72a, 72b and 74a, 74b which snugly receive and hold the angled parts 70 of the line guide 12.

The rod 10 is conventionally tapered, which means that the diameter of the rod at the locations of the two line guides 12 in FIG. 1 must be different. Inasmuch as the two fixtures 24 and 26 are utilized to position and secure the line guides 12 of FIG. 1 to the rod at the locations shown, the bores 54a, 54b therein must be of correspondingly different diameter.

As shown in FIG. 6, the two fixtures 24 and 26 are spaced apart. Two crossbars 76 and 78 are secured to the bottom 30 of the carrier 28 as shown, pins 80 fitting into companion holes 82 in the bottom 30 for locating the crossbar 76. The holes 82 are arranged in pairs which are in transverse alignment, the pairs being spaced equally longitudinally of the carrier 28.

On each crossbar 76 is an upright post 84 to which is secured a tension spring 86. The other end of the tension spring 86 is secured to a post 88 on the sliding block 36. Both springs 86 are of such size and tension to move the respective fixtures 24 and 26 toward the right.

The two air cylinders 44 are connected to a source of air pressure, not shown, by means of a control valve 90 operated by means of a suitable electrical switch 92. These parts are conventional, and so arranged that operation of the switch 92 in one direction will actuate the air cylinders 44 to lift the blocks 46 out of engagement with the lower blocks 38 and in the opposite direction to close the blocks 46 onto the lower blocks 38.

In a typical assembly operation, the switch 92 is so operated as to elevate the blocks 42 to the upper position shown in FIG. 7. The springs 86 have previously drawn the respective fixtures 24 and 26 toward the right to a position immediately adjacent to the respective crossbars 76.

Coils 18 are inserted into the respective locating cavities 58 and 62 in the two fixtures 24 and 26, these coils being of different size to correspond to the diameter of the tapered rod to be fitted thereinto. Line guides 12 are inserted into the coils and laid into the respective grooves 72b and 74b in the lower block 38 as shown in FIG. 7, the legs 16 of the guide being fitted inside the coils 18. The bore cavities 58 and 62 as well as the bore portions 56 and 66 are so sized and arranged that the legs 16 of each guide will be positioned to be engaged by a rod 10 as it is inserted into the respective bores 54a, 54b of the two fixtures 24 and 26.

With the coils 18 and the guides 12 positioned in the base blocks 38 of the two fixtures 24, 26, the switch 92 is operated to close the upper blocks 46. As explained previously, these upper blocks 46 have bore and cavity portions formed therein which register with the bore and cavity portions in the lower block 38 to intimately engage and position the coils 18 as well as the guides 12. The blocks 38 and 46 thereby may be characterized as jaw members of a vice.

A tapered rod 10a is next inserted into the bore 54a, 54b of the fixture 26 and passed therethrough as well as the coils 18 therein into the bore 54a, 54b of the fixture 24. The bore 54a, 54b in the fixture 26 is larger than the bore in the fixture 24 for the obvious reason that the larger diameter portion of the rod 10a must coincide with the fixture 26 when completely inserted.

The rod 10a is inserted through both of the fixtures 24 and 26 until the coils 18 in one of the fixtures first tightens on the rod 10a. Assuming that the coils 18 in the fixture 24 are the first to tighten, the rod 10a is further moved toward the left carrying with it the fixture 24 and stretching the spring 86. Eventually, the rod 10a engages the coils 18 in the fixture 26 and causes corresponding movement of this fixture. At this moment, with the rod 10a snugly tightened in the coils 18 in both fixtures, the rod may be tapped with a hammer or otherwise forced more deeply into the coils, always encountering the resistance of the springs 86 and the inertia of the fixtures 24 and 26. This results in the coils 18 being intimately securely tightened onto the rod, thereby to secure the respective guides 12 in place.

The switch 92 may then be actuated to lift the jaw 46 to permit withdrawal of the rod from the fixtures with the line guides 12 assembled thereto.

While there have been described above the principles of this invention in connection with specific apparatus, it is to be clearly understood that this description is made only by way of example and not as a limitation to the scope of the invention.

What is claimed is:

1. In a fishing rod assembly comprising an elongated tapered rod and a line guide having at least one leg for securing the same to the surface of said rod, the combination with said rod and line guide of at least one multiple turn helical resilient wire coil snugly encircling both said leg and said rod, said leg being elongated and super-posed on the surface of said rod, said leg extending longitudinally of said rod, a plurality of the turns of said coil forcefully pressing said leg and rod together to thereby frictionally secure the line guide to said rod, said coil having a unsprung preformed inner transverse dimension smaller than the cross-sectional dimension of said leg and rod as superposed whereby the turns of said coil on said leg are resiliently deformed which produces the aforesaid forceful pressing of said leg and rod together.

2. The assembly of claim 1 in which the turns of said coil are contiguous.

3. The assembly of claim 2 in which said line guide has two of said legs collinearly extending oppositely with an upstanding support structure rigidly secured to the adjacent ends thereof, two of said helical coils snugly encircling said rod and two legs, respectively, as aforesaid, said coils each completely covering said legs and securing them frictionally to said rod.

4. The assembly of claim 1 in which said leg gradually increases in thickness from the distal end toward the opposite end, said thickness extending in a direction radially of said rod, said turns yieldably forcefully pressing said leg along the length thereof against said rod, said turns having preformed shapes yieldably distorted by engagement with said leg and rod.

5. The assembly of claim 4 in which said leg is rectangular in cross-section and said turns engage forcefully the two outer corners thereof in frictionally securing said leg to said rod.

* * * * *